Jan. 26, 1965    R. W. JENSEN ETAL    3,167,195
FRONT LOADING MEANS FOR TRUCKS
Filed June 6, 1960    6 Sheets-Sheet 1

Inventors:
Raymond W. Jensen and
Joseph E. McDonald.
By Harold J. Le Vescoute
Atty.

Jan. 26, 1965  R. W. JENSEN ETAL  3,167,195
FRONT LOADING MEANS FOR TRUCKS
Filed June 6, 1960  6 Sheets-Sheet 4

Fig. 3.

Inventors:
Raymond W. Jensen and
Joseph E. McDonald.
By
Harold J. LeVesconte
Atty.

United States Patent Office 3,167,195
Patented Jan. 26, 1965

3,167,195
FRONT LOADING MEANS FOR TRUCKS
Raymond W. Jensen, Los Angeles, Calif., and Joseph E.
McDonald, 1703 Alamo Drive, Glendale, Calif.; said
Jensen assignor to said McDonald, Glendale, Calif.
Filed June 6, 1960, Ser. No. 34,307
9 Claims. (Cl. 214—302)

This invention relates to loading means for picking up and dumping containers of rubbish and the like into a truck body and relates more particularly to an improved form of the so-called "front loader" type of loading means in which the container is picked up in front of the truck, swung upwardly and rearwardly over the truck cab, the container contents dumped into the truck body, and the container returned to the ground and disengaged from the lifting means.

Heretofore, the various proposals for front loading devices have all had undesirable features. First, it has been deemed necessary to provide pivoted lifting arms journaled on an axis transversely of the truck chassis and mounted on the chassis to the rear of and below the plane of the cab. These long arms and the unfavorable leverage resulting therefrom subjected the truck chassis to stresses for which it was not designed. Also these arms swung past the sides of the cab and constituted a hazard for the truck driver although one proposal is known wherein an attempt to reduce this hazard is made by further lengthening these lifting arms by arching them around the profile of the cab doors. Again, in the newer models of trucks, the cab is as wide as the truck body and the latter, of course is generally made to the full width allowed by law, wherefore, the said lifting arms could not be used on the outside of the cab or of the truck body. In this connection, certain prior proposals of front loaders arched these swinging arms sufficiently so that they extended over the front fenders thereby staying within the legal width limits of the truck. In all of these prior proposals, the manufacturer of the loader has been obliged, in addition to building his loading device, to modify the truck on which the leader is mounted and such modification prevents later re-conversion of the truck to normal truck use without abnormal expense.

Another difficulty in the construction of these front loading devices involves the manipulation of the containers so that the contents are not spilled incident to lifting them and so that they are maintained at least substantially upright until they are in position for discharge of the contents. In general, the prior proposals for this purpose have involved either providing the container with a side or bottom door to release the contents or providing means (usually a hydraulic cylinder means) on the lifting arms which can be controlled during lifting and lowering movements to provide relative rotation or pivoting of the container on the lifting arms to maintain it upright and at the desired time, to invert it for dumping the container contents into the truck body. The first of these proposals is objectionable in that the container is not adapted to handle anything but dry rubbish and the second proposal requires expert and constant manual control of the dumping means while the container is being lifted and lowered. Further, the operating means is unnecessarily complex and costly to manufacture, install, and maintain.

With these considerations in mind, it is an object of the present invention to provide a front loading means for truck bodies which is mounted on and forms a unit therewith of the truck body.

Another object of the invention is to provide a front loading means for motor trucks in which the load lifting means is mounted for movement about a horizontal axial line disposed above the truck cab and sufficiently forwardly so that in its lowered position the load lifting means does not obstruct opening of side doors of the cab.

Still another object of the invention is to provide a load lifting means for detachable engagement with containers placed in front of the truck and which lifting means includes means for automatically maintaining the loaded container in an upright position during the traverse to the dumping position.

A still further object of the invention is to provide a front loading means for motor trucks which is disposed wholly in front of the truck body wherefore, the truck body may be made the full width allowed by law.

A still further object of the invention is to provide a front loading means for motor trucks which is so constructed and arranged that the lifting means comprises arm members which are mounted for swinging movement about an axis above the load to be picked up, wherefore, the load is initially picked up by said arms moving from a substantially vertical position.

Still another object of the invention is to provide a rubbish collecting unit comprising a body mountable on a motor truck, and a loading means mounted on the front end of said body operable to lift containers of rubbish upwardly and rearwardly over the truck cab and dump the contents into the truck body.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIGS. 2a and 2b are, respectively, fragmentary sectional views, on enlarged scale, taken on the lines 2a—2a and 2b—2b of FIG. 4 as viewed from the front of the loading means, FIG. 6 is a fragmentary sectional view taken on the line 6—6 of FIG. 3 and particularly showing a portion of the means by which the container is maintained upright during lifting and lowering and which is also the means for inverting the container for dumping the contents thereof, FIG. 6a is a reduced scale, fragmentary side elevational view showing the details of attaching the removable cover means for the sprockets and chains shown in FIG. 6, FIG. 13 is a fragmentary perspective view of the distal ends of a pair of bracket plates for mounting one of the lifting arms and, FIG. 14 is a circuit diagram of the hydraulic means for operating the various components of the invention.

The illustrated embodiment of the invention comprises a body 1 of generally rectangular configuration mountable on the frame F of a motor truck and secured thereon by any suitable means as, for example, bolts 2. The truck body is completely enclosed except for a receiving hopper 3 at the forward end of the top surface; said hopper having a plate 4 carrying reinforcing members 4'; said plate forming rearwardly sloping surface at the bottom of the hopper. Access to the interior of the body is had through a rear door 5 pivotally mounted at 5' and operated by a hydraulic ram 6 and through cleanout doors 7 at the lower forward sides of the body. Preferably, the body is of welded construction and formed from steel plate and including sides 8, bottom 9, roof 10 and front wall 11 extending upwardly to meet the sloping bottom member 4 of the hopper 3, the plates being reinforced, where necessary by channel members 12 having the edges thereof welded to the outer surfaces of the members or plates forming the body, it being desirable that the interior of the body be kept smooth to permit the unobstructed movement of the contents toward the rear door under compulsion of a reciprocable compacting blade within the body (not shown). Additionally, diagonally extending reinforcing members 14, 14 support the hopper bottom member 4 at their upper ends. It will be understood that while only the left hand side of the truck body is shown in detail, the right hand side is a mirror image thereof.

The front end of the body carries a first bracket structure 15 projecting over the truck cab C forwardly from the left hand side thereof to a free end 16 forwardly of the cab with the outer face of said bracket disposed in the plane defining the left hand side of the truck body and said front end of the body also carries a reversely identical bracket 15a projecting from the right hand side thereof parallel to said first bracket and terminating in a free end 16a laterally opposite said free end of said first bracket. Since these brackets and the component parts thereof as well as the parts of the mechanisms associated therewith are reversely identical or, in other words, are mirror images of each other with respect to the arrangement thereof, those at the left hand side or associated with the left hand bracket will be specifically described and the right hand parts will be numbered the same as the left hand parts with the addition of the exponent "a" as has been done with the numerals "15" and "16" above.

The bracket 15 comprises an outer side plate 17 disposed in the plane of the left hand side of the truck body and having its rear edge welded to the hopper bottom 4 and front wall 11. The upper and lower edges of the plate converge to form a part of the rounded distal end 16 of the bracket disposed above and in front of the cab C. The bracket further includes an inner side plate 18 extending in spaced parallel relation to the plate 17 and similarly having its rear edge welded to the said hopper bottom and front wall and having the upper and lower edges thereof converging to a rounded end forming another portion of the bracket end 16. A portion of the lower edge of the plate 17 is cut away to form a clearance 19 for a hydraulic ram to be hereinafter referred to as the lift cylinder 20 and to which detailed reference will later be made, and the upper edge of the plate 18 terminates at a lower level than the upper edge of the plate 17 to provide clearance for a second hydraulic ram which will hereinafter be referred to as the dumping cylinder 21. The forward lower edges of the plates 17 and 18 are interconnected by a transverse plate 22 welded thereto. A second cross plate 23 is welded to the side of the plate 18 parallel to the top edge thereof from the hopper bottom 4 to a point adjacent the distal end thereof and has the other side edge thereof welded to the adjacent side of the plate 17. A third cross plate 24 has one side edge thereof welded to the lower edge of the plate 17 in the clearance forming portion 19 thereof and has its other side edge welded to the adjacent side of the plate 18.

The distal end of the plate 17 has a transverse opening therein in which a ring 25 of greater thickness than the plate material is welded; said ring being disposed with the axial line thereof extending horizontally above and forwardly of the truck cab. The corresponding end of the plate 18 similarly carries a semicircular flange portion 26 having the same radial dimension as the inner diameter of the ring 25 and disposed in the same axial line; said flange portion having the open side thereof disposed in registry with a diagonally downwardly and rearwardly extending slot 27 formed in the upper edge of the plate 18. While the formation of the brackets 15 and 15a has thus been described as comprising welded components, it will be appreciated that this is only by way of describing the disclosed embodiment and that the brackets can as well be formed of other welded components or be formed as castings where such formation makes the use of castings economical.

Mounted in the ring 25 is a bushing 28 having a flange 29 engaging the outer face of the plate 17 and mounted in the flange portion 26 is a bushing 30 having a flange 31 engaging the inner face of the plate 18, said bushings being of the same internal diameter and serving as bearings for a hollow rock shaft 32 journaled therein. The rock shaft is of considerably less length than the dimension between the outermost faces of the bushing flanges and carries a cylindrical bar 33 mounted therein which is of only slightly less length than said dimension; said bar having axially disposed threaded holes 34 at each end thereof engaged by the threaded ends of screws 35 which extend through washers 36 engaging the outer faces of the bushing flanges and thus clamp the bushings tightly against the respective ring and flange faces without imposing end thrust on the shaft 32.

The shaft 32 at about the mid-length thereof carries a sprocket 37 fixed thereon by any suitable means such as, for example, welding. The bushing 29 extends through the ring 25 almost to the face of the sprocket and freely mounted on the exterior of the bushing 28 between the adjacent faces of the ring 25 and sprocket 37 is a bearing sleeve 38 extending through the upper end of and forming an integral part of a lifting arm 39 whereby said arm is mounted for pivotal movement about the axis of the shaft 32. Also fixed to the shaft by welding or other appropriate means is the hub 40 of a dump actuating lever arm 41, said hub being disposed with an end face thereof bearing against the end face of the bushing 30 opposite the flanged end thereof. The free end of the arm 41 is bent at a right angle as at 42 and is pivotally connected by a pin 43 in the slotted end 44 of the piston rod 45 of the dumping cylinder 21. The opposite end of the cylinder 21 is provided with a rearwardly projecting tongue portion 46 which is pivotally connected by a pivot pin 47 between a clevis comprising an upwardly extending portion 48 of the rear upper edge of the plate 18 and a member 49 extending in spaced parallel relation to said portion and welded to the top surface of the cross plate 23 and the front face of the hopper bottom 4. The remainder of the container dumping means and the operation thereof will be later described in detail.

The lifting arm 39 is of hollow, rectangular construction and at the end opposite the end having the sleeve 38 is provided with a similar sleeve 50 welded therein and extending therethrough parallel to the sleeve 38. The opposite lifting arm 39a is, of course, provided with a corresponding sleeve 50a. Mounted in the sleeves 50 are bushings 51 and 51a having flanges 52 and 52a which engage the outer side surfaces of the respective lifting arms. These bushings afford bearing support for the opposite ends of a rock shaft 53, said rock shaft being hollow and having a plug element 54 at each end provided with an axially disposed threaded bore engaged by a screw 55 effective to clamp a washer 56 against the adjacent bushing flange 52. The bushing 51 extends through and beyond the inner end of the sleeve 50 and engages the side of a sprocket 57 welded or otherwise secured to the rock shaft 53 in alignment with the sprocket 37. Since the opposite ends of each bushing are engaged by the washer and sprocket on the related end of the rock shaft 53, individual endwise movement between each arm and the rock shaft is prevented and since the outer faces or flanges of the bushings are engaged by the washers, any tendency of the ends of the arms 39 and 39a to spread apart is prevented.

Figures 2, 9, 10, 11:
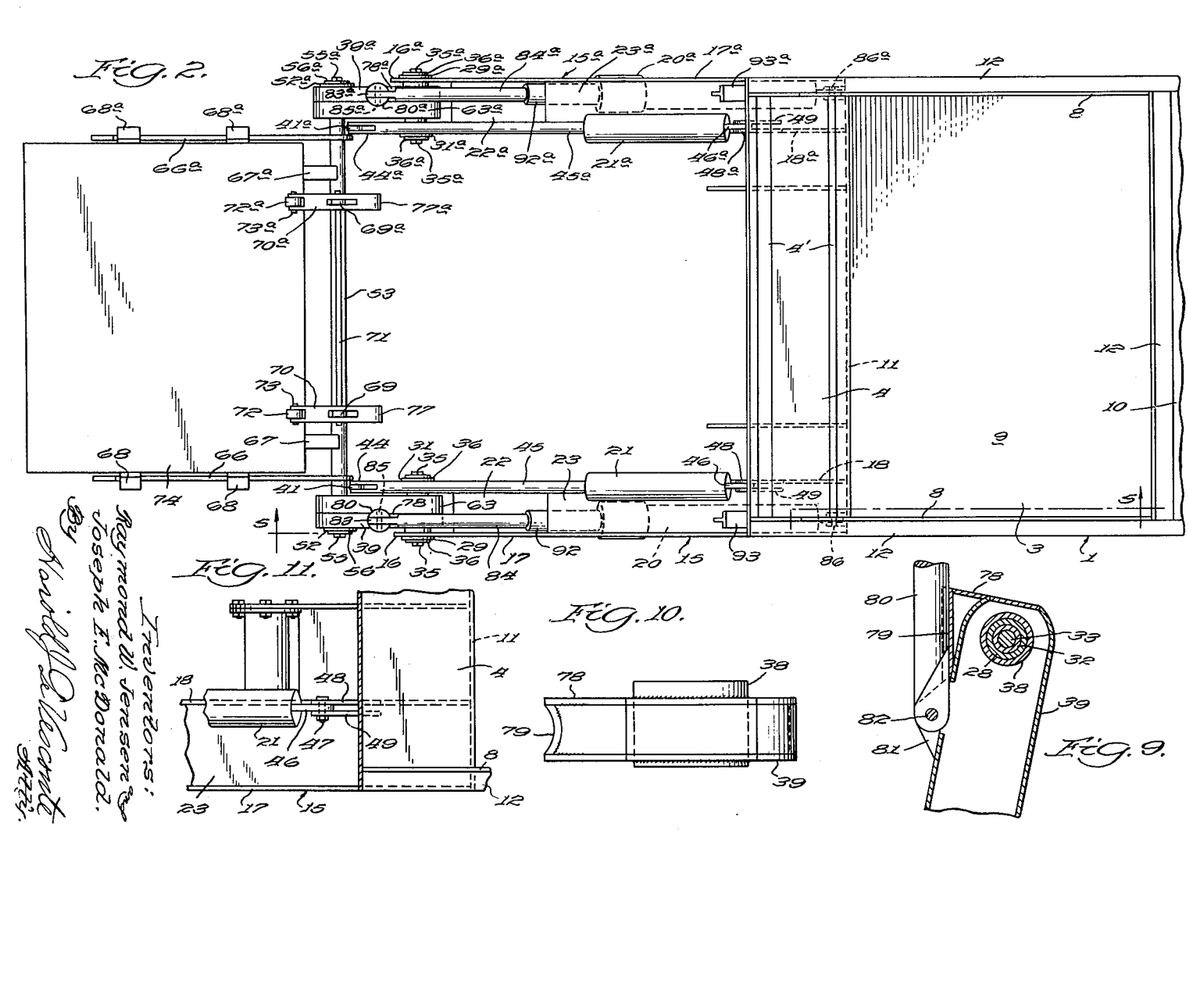
FIG. 2 is an enlarged scale, top plan view of the front end of the body and loading means including a container to be lifted.
FIG. 9 is a fragmentary sectional view taken on the line 9—9 of FIG. 3 and showing details of the means for imparting lifting movements to the arm elements.
FIG. 10 is an enlarged top and elevation of the lifting arm shown in FIG. 9.
FIG. 11 is a fragmentary sectional view showing in top plan the mounting of the cylinder component of a hydraulic ram for dumping a container.
Figures 2A, 2B, 6, 6A, 13, 14:
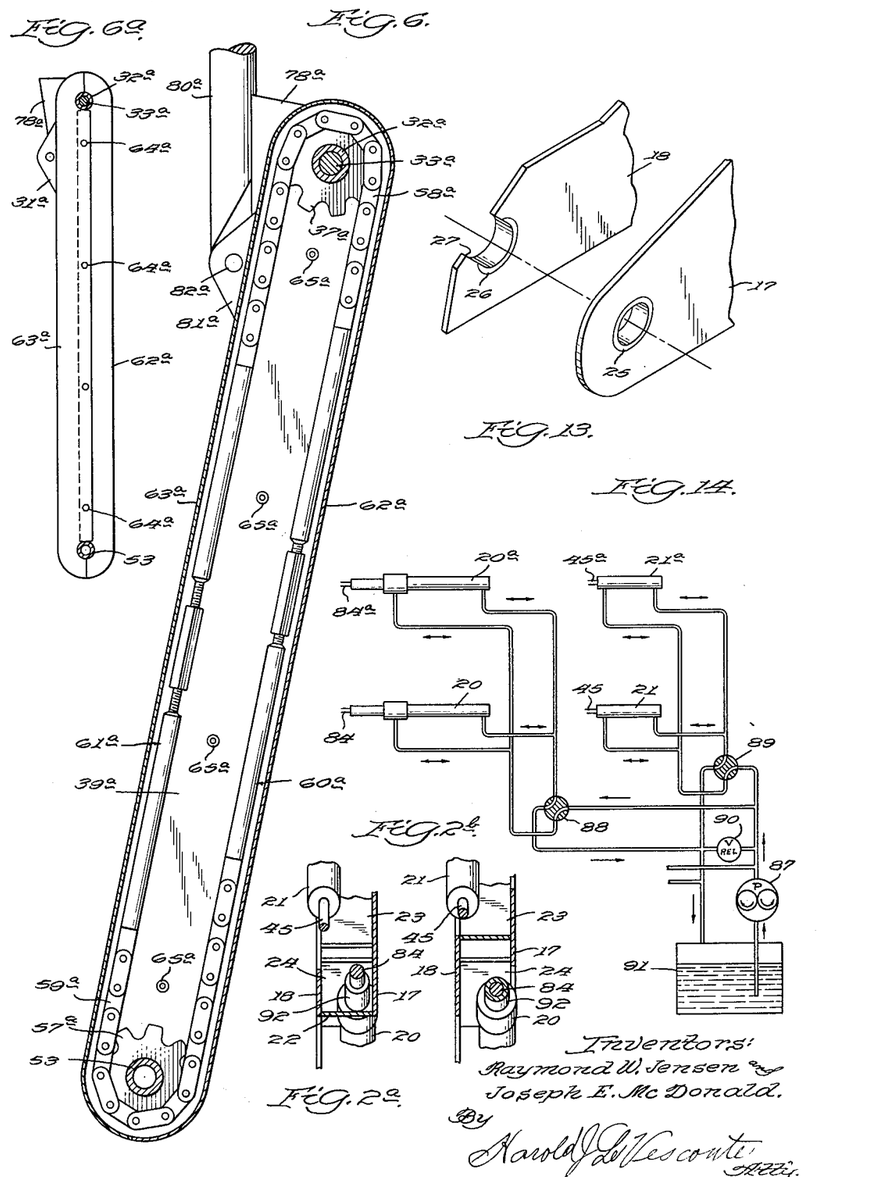
Figure 3:
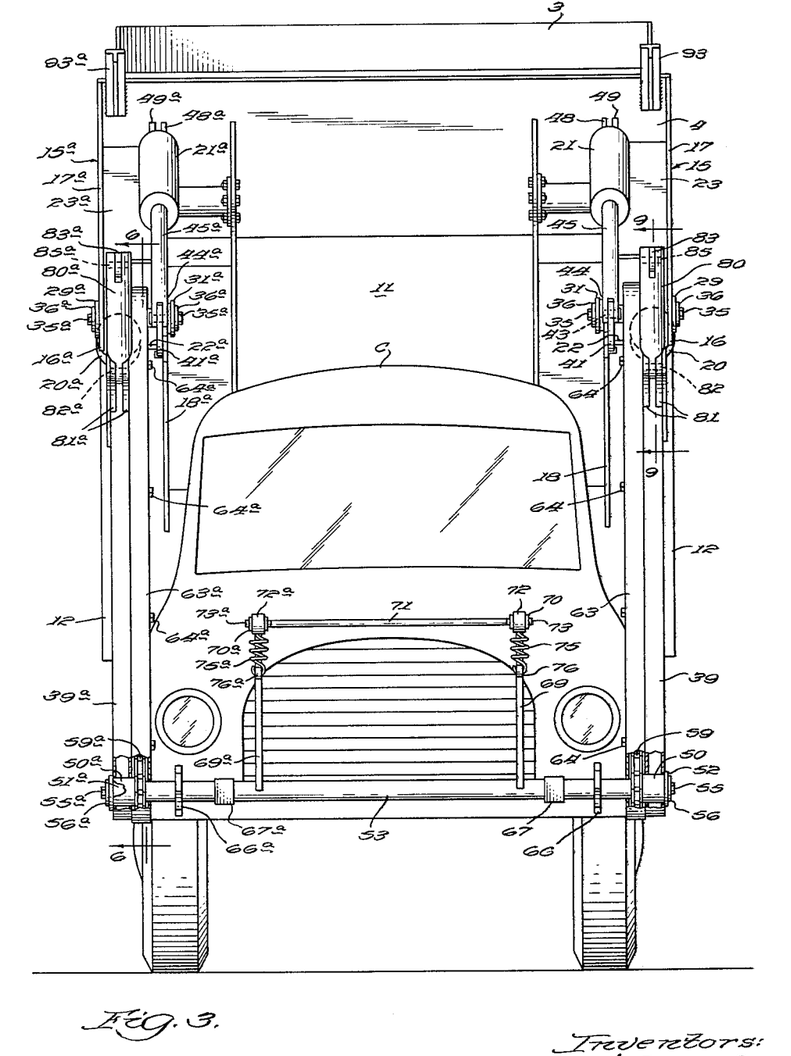
FIG. 3 is an enlarged scale front elevational view of the truck equipped with the body and loading means shown in FIG. 1, portion being broken away to show details of construction.

The sprockets 37 and 57 which are disposed adjacent to the arm 39 are identical and are interconnected by an endless chain assembly comprising a length of chain 58 trained over the sprocket 37, a second length of chain 59 trained over the sprocket 57 and turnbuckle assemblies 60 and 61 interconnecting and forming reaches between the adjacent ends of the lengths of chain as best shown in FIG. 6. The sprockets associated with the arm 39a are similarly interconnected. These turnbuckle assemblies serve two useful purposes. First, since the sprockets make less than a full rotation, the turnbuckles can be employed as being less expensive to manufacture than chain for the reaches they occupy. Second, they provide means for establishing desired tension and elimination of slack in the chains while maintaining the center distance established by the sleeves at the ends of the arms. The respective pairs of sprockets and their respective chain assemblies are housed by two part cover elements 62 and 63 which overlap along the line extending through the axes of the sprockets and are detachably secured in place by screws 64 which extend through mating holes in the overlapping edges and engage interiorly threaded studs 65 projecting laterally from the sides of the respective arms.

The rock shaft 53 carries a pair of radially extending container engaging arms 66 and 66a disposed parallel to each other and said arms are located adjacent to the respective chain assembly housings and when extending horizontally forward with the arms 39 lowered, are adapted to straddle the ends of a rubbish container to the extent allowed by the stop members 67 and 67a also carried by the rock shaft 53 and to engage suitable complementary means on the container ends as, for example, pairs of lug elements 68 and corresponding lug elements 68a on the opposite end. Preferably, the distal ends of the arms 66 and 66a are enlarged to prevent unintended dislodgement of the container therefrom. The rock shaft 53 is also provided with radially extending arms 69 and 69a disposed inwardly of the adjacent arms 66 and 66a and are arranged to occupy a vertical position when the arms 66 and 66a are in container engaging position. These arms 69 and 69a at their distal ends carry levers 70 and 70a which are mounted for pivotal movement on the ends of a rod 71 extending between the forward ends of said levers are bifurcated to receive a pair of rollers 72 and 72a mounted on axles 73 and 73a and adapted to engage the front edge of the closed lid 74 of the container and the rollers are urged into yielding engagement with said lid by tension springs 75 and 75a extending btween the roller carrying ends of said levers and arms 76 and 76a projecting forwardly from the arms 69 and 69a. The opposite ends of said levers are curved as at 77 and 77a to constitute camming faces for disengagement of the rollers from the container lid as will be presently referred to in detail.

Figure 1:
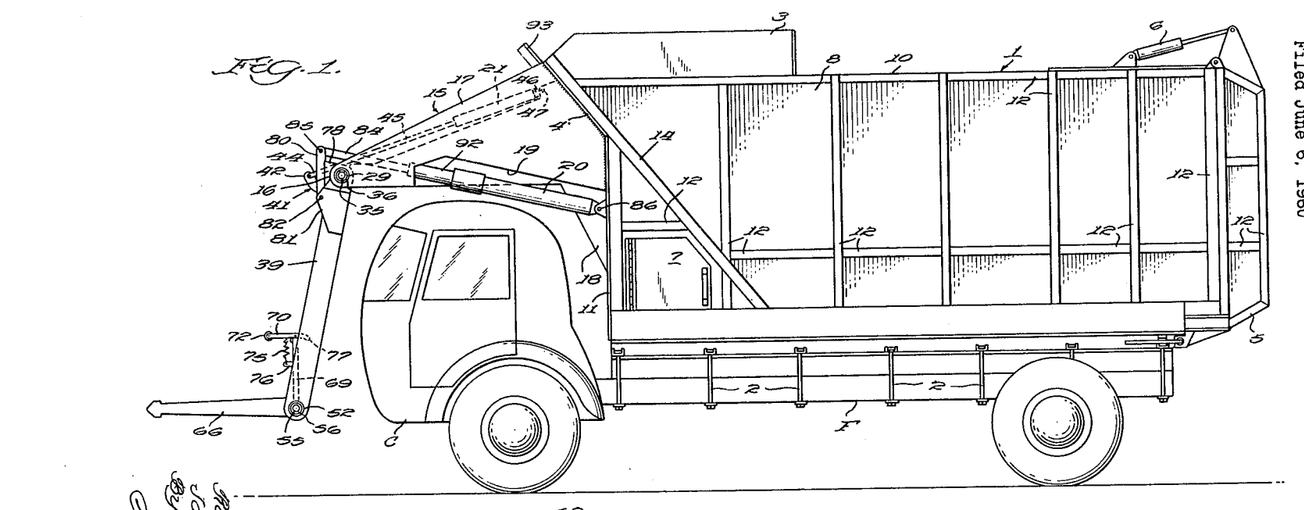
FIG. 1 is a side elevational view of a motor truck with a combined body and front loading means of the present invention mounted thereon.

The arm 39 at the front upper edge thereof is provided with a longitudinally extending saddle member 78 having a concave seat 79 adapted for engagement with the side surface of an elongated, cylindrical link 80 which has one end thereof formed as a tongue portion received between clevis elements 81, 81 carried by the arm 39 below the saddle member and a pivot pin 82 secures said tongue end to the clevis elements. When the arm 39 is in the lowered position as shown in FIG. 1, the upper end of the link extends above the upper end of the arm and said other end is provided with a transverse slot in which the mating tongue 83 on the distal end of the piston rod 84 of the lifting cylinder 20 is hingedly secured by a hinge pin 85. It will be noted that the hinge pins 82 and 85 are parallel to the axis of the bushing 28 about which the arm 39 has its movement. It will also be noted in FIG. 5a that the link 80 is of the same diameter as the piston rod 84 and that the hinge joint formed by the pin 85 preserves this cylindrical configuration.

Figure 4:
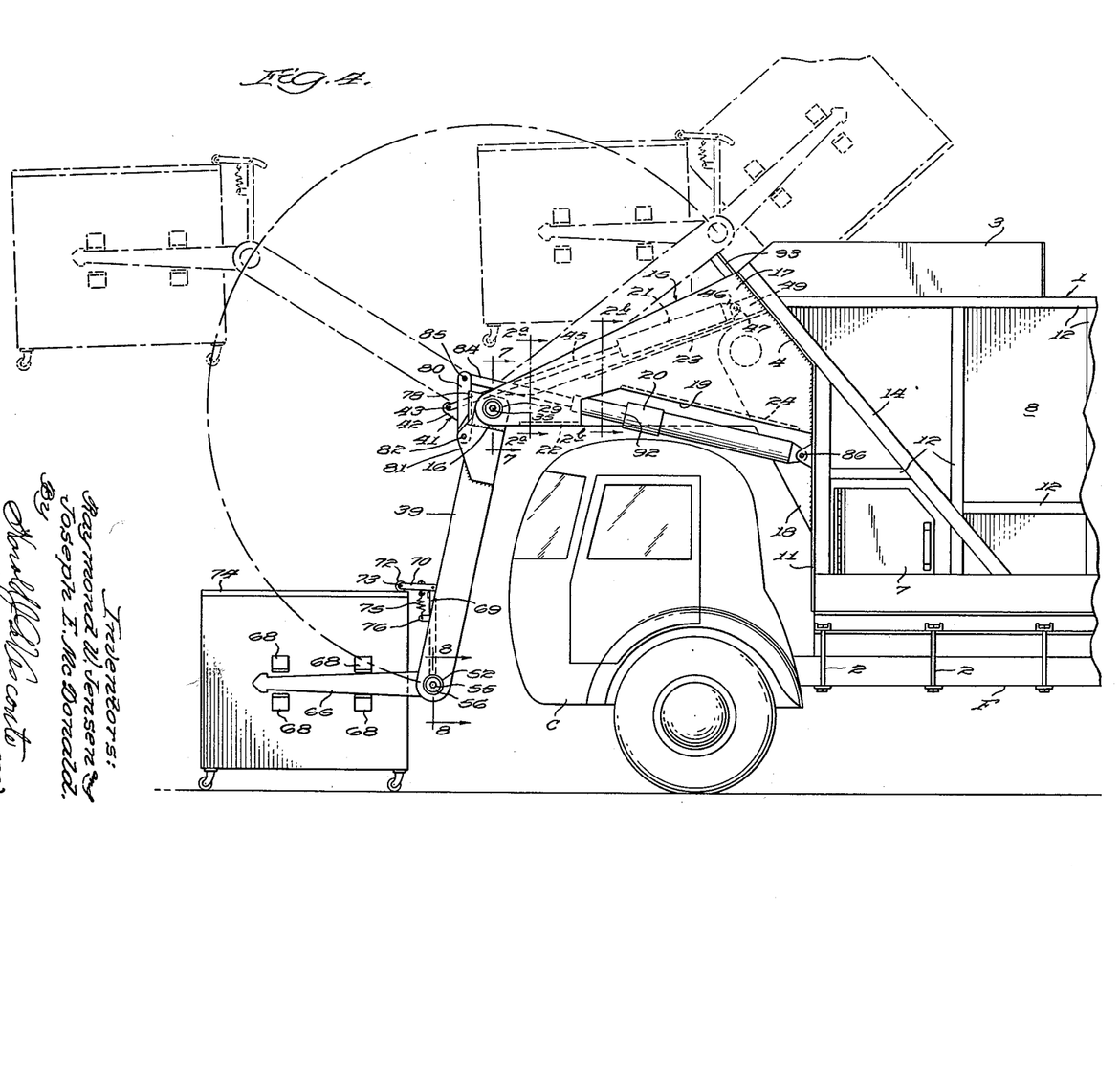
FIG. 4 is a side elevational view of the front end of the truck and body and particularly showing the loading means in several positions incident to lifting a container and dumping the contents thereof into the truck body.
Figures 5, 5A, 7:
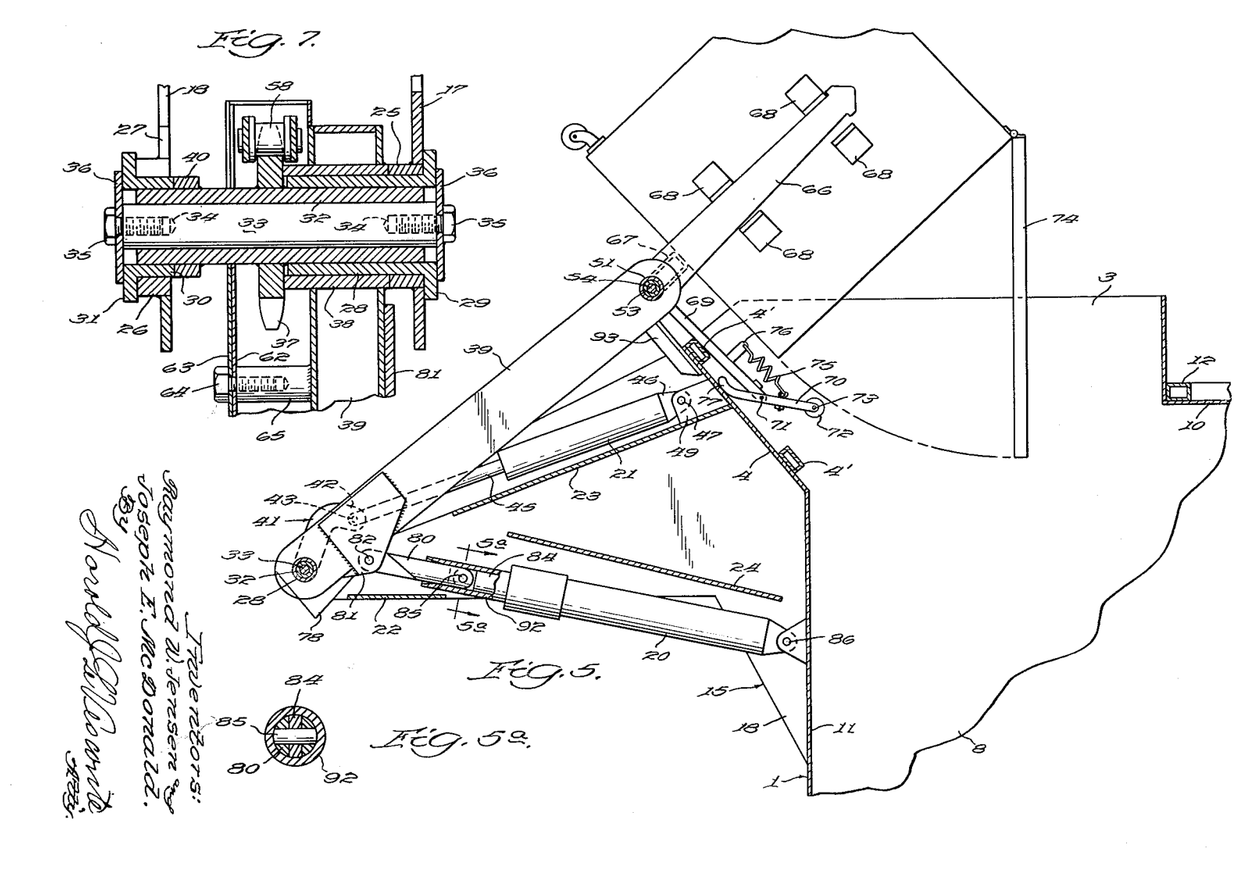
FIG. 5 is a further enlarged fragmentary sectional view taken on the staggered line 5—5 of FIG. 2 showing details of the actuation of the container dumping means.
FIG. 5a is an enlarged scale sectional view on the line 5a—5a of FIG. 5.
FIG. 7 is a further enlarged, fragmentary sectional view of the bearing from the pivotally mounted end of one of the lifting arms, the section being taken on the line 7—7 of FIG. 4.
Figure 8:
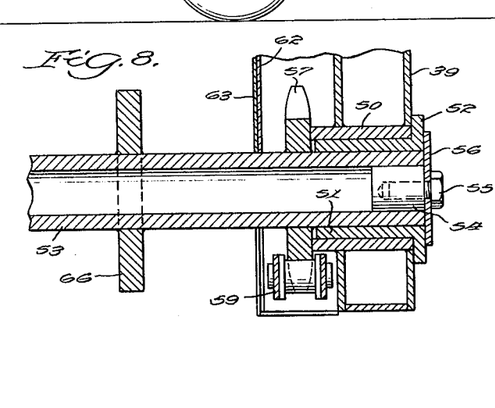
FIG. 8 is a sectional view of the bearing structure at the opposite end of one of the lifting arms, the view on the same scale as FIG. 7 and being taken on the line 8—8 of FIG. 4.
Figure 12:
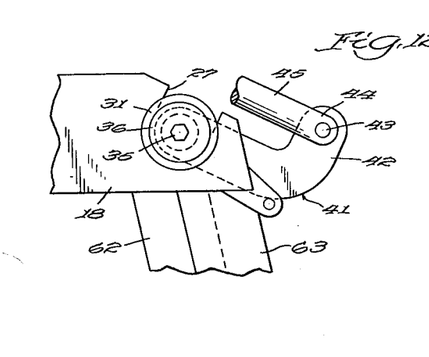
FIG. 12 is a fragmentary side elevational view of the connection of the piston component of the hydraulic ram for effecting dumping of a container.

As best shown in FIGS. 1, 4 and 5, the rear end of the cylinder 20 is pivotally connected by a pivot pin 86 to a clevis means carried by the front wall 11, of the truck body. The cylinder 20a is correspondingly mounted at the opposite side of the body.

The hydraulic system of the invention is diagrammatically shown in FIG. 14 and comprises a pump 87 adapted to be actuated by any convenient means such as a separate motor or a power takeoff from the truck motor, flow reversing valves 88 and 89 positioned for convenient operation by the truck driver and connected to control the operation of the lift cylinders and the dumping cylinders, respectively, a pressure relief valve 90 and a reservoir 91 together with the necessary fluid conduits for suitably interconnecting the said hydraulic system components, it being noted that the said cylinders are all of the double acting type.

The few elements of the disclosed embodiment of the invention not yet described can best be described in connection with the explanation of the operation of the device. Assuming that the truck with the body and associated means of the invention is in the position shown in FIG. 1, the truck is moved forward into engagement with a container or, alternatively, if the container is mounted on casters, the container may be moved into engagement with the arms 66 and 66a to the extent permitted by the stops 67 and 67a with incident engagement of the container lid by the rollers 72 and 72a on the levers 70 and 70a as shown in FIGS. 2 and 4. The lift cylinders 20 and 20a are energized to retract the piston rods thereof and at the beginning of such movement the piston rods will pull against the links 80 and 80a as though they constituted extensions of the arms 39 and 39a thus decreasing the leverage ratio thereof at the beginning of the lifting action and causing the arms with the container carried thereby to move in a clockwise direction about the axis of the mounting of said arms on the brackets 15 and 15a. During this time, the dumping cylinder pistons are at their forward position bringing the arms 66 and 66a to horizontal position. The sprockets 37 and 37a being thus held against movement, the movement of the arms 39 and 39a about the axial line of these sprockets and carrying the sprockets 57 and 57a with them will cause the chain assemblies to impart corresponding relative reverse rotation to the shaft 53 so that the arms 66 and 66a and the container continue to retain the upright position during the entire excursion of the lifting arms.

The continued retraction of the lifting cylinder pistons and their piston rods next brings the links 80 and 80a into axial alignment with the piston rods to which they are connected and the continued retraction carries the hinge joints therebetween into the guide sleeves 92 and 92a at the forward ends of the cylinders 20 and 20a until the arms 39 and 39a swing the container over the hopper 3 and engage the stop members 93 and 93a at each side of the hopper opening. The dumping cylinders are then actuated to retract the pistons thereof causing clockwise rotation of the shafts 32 and 32a as well as of the sprockets 37 and 37a with resultant clockwise rotation of the shaft 53 by the chain assemblies and inversion of the container until the arms 69 and 69a engage the uppermost of the reinforcing members 4' as shown in FIG. 5. Incident to this dumping movement, the camming ends 77 and 77a of the levers 70 and 70a engage the hopper bottom 4 and are displaced thereby against the bias of the springs 75 and 75a releasing the lid of the container and allowing the contents to be discharged by gravity into the hopper. The container can then be restored to its upright position and the arms moved in the return movement to return the contour to the ground. As an incident to this movement, the sleeves 92 and 92a operate to prevent the hinge joints between the piston rods 84 and 84a and the links 80 and 80a from buckling while the arms 39 and 39a are being moved to the vertical position by compression forces on the said rods and links. After the arms and the container have passed the vertical position, the weight thereof will apply tension to the said rods and links and thus make the need for further guidance unnecessary.

While in the foregoing specification there has been disclosed a presently preferred embodiment of the invention in which the stated objectives are realized in practice, it is appreciated that in the light of such disclosure, changes and modifications may suggest themselves to others skilled in the art to which the invention appertains. Accordingly, the invention is not to be deemed to be limited to the precise embodiment thus disclosed by way of example and it will be understood that the invention includes as well, all such changes and modifications in the parts, and in the construction, combination and arrangement of parts as shall come within the purview of the appended claims.

We claim:

1. A rubbish loading and transporting unit comprising a body structure adapted to be mounted on a truck chassis for the reception of collected rubbish; said body structure including a portion extending above and forwardly beyond the truck cab, and a loading means carried by said portion of said body structure comprising a rubbish container lifting means mounted on said body structure portion for pivotal movement about a horizontal axial line extending transversely of the truck and disposed in a vertical plane disposed not farther rearward than the forward edge of the access door of the truck cab.

2. A material handling unit comprising a body structure mountable on a truck chassis and having a material receiving opening in the top thereof, and means mounted wholly on said body structure for filling said body through said opening comprising devices for lifting a container of material to be loaded from the point of engagement therewith to a position above said opening and for inverting the container to dump the contents thereof and for return of the container; said devices including means for detachable interlocking engagement with a container, manually controlled power actuated devices connected to said container engaging means effective to lift a container engaged thereby to a position over said opening, other power actuated devices independently manually operative to invert the container engaged and lifted thereby for discharge of the contents therefrom into said opening; said container lifting means being mounted for pivotal movement about a horizontal axis extending transversely of the truck chassis in fixed relation to said body structure and disposed both forwardly of and above the upper front corner of the access door of the truck cab.

3. A material handling unit comprising a body structure mountable on a truck chassis and including a material receiving space defined by a bottom, side walls, a rear wall and a front wall; said front wall having loading means comprising a pair of brackets laterally spaced apart and projecting forwardly therefrom and terminating in distal ends disposed above and forwardly of the truck cab door, a first arm having one end thereof pivotally mounted on the distal end of one of said brackets for movement about an axial line extending horizontally transversely of said body structure, a second arm similarly mounted for movement about the same axial line on the distal end of the other of said brackets, means for supporting a container of material to be loaded carried by the opposite ends of said arms, and power means operable to move said arms simultaneously on the respective pivotal mountings thereof with resultant lifting of the container to a position above said material receiving space.

4. A material handling unit comprising a body structure mountable on a truck chassis and including a material receiving space defined by a bottom, side walls, a rear wall and a front wall; said front wall having loading means comprising a pair of brackets laterally spaced apart and projecting forwardly therefrom and terminating in distal ends disposed above and forwardly of the truck cab door, a first arm having one end thereof pivotally mounted on the distal end of one of said brackets for movement about an axial line extending horizontally transversely of said body structure, a second arm similarly mounted for movement about the same axial line on the distal end of the other of said brackets, means for supporting a container of material to be loaded carried by the opposite ends of said arms, power means operable to move said arms simultaneously on the respective pivotal mountings thereof with resultant lifting of the container to a position above said material receiving space, and other devices extending between said body structure and said container supporting means operable to invert said container for the discharge of the contents thereof into said material receiving space.

5. A material handling unit comprising a body structure mountable on a truck chassis and including a material receiving space defined by a bottom, side walls, a rear wall, and a front wall, and loading means adapted to pick up containers of material at the front of the truck and lift the containers over the truck cab and dump the container contents into said space; said loading means comprising a pair of laterally spaced, parallel brackets projecting generally horizontally forwardly from said body structure and terminating in distal end portions disposed above and forward of the front of the truck cab, a first arm having one end thereof pivotally mounted on the distal end of one of said brackets for movement about an axial line extending horizontally transversely of said body structure, a second arm similarly mounted for movement about the same axial line on the distal end of the other of said brackets, means for supporting a container of material to be loaded carried by the opposite ends of said arms, and power means operable to move said arms simultaneously on the respective pivotal mountings thereof with resultant lifting of the container to a position above said material receiving space.

6. A material handling unit as claimed in claim 5 in which said power means comprises a pair of hydraulic cylinders and valve means for controlling the action thereof disposed for operation by the truck operator.

7. A material handling unit as claimed in claim 5 in which said arms support means actuated by movement of said arms effecitve to maintain said container supporting means in an upright position during the entire lifting movement.

8. A material handling unit as claimed in claim 7 including other power means under control of the truck operator and connected to said position maintaining means effective to invert a container to discharge the contents thereof into said receiving space.

9. A material handling unit as claimed in claim 7 including a pair of hydraulic cylinders, a valve means under control of the truck operator for controlling the action of said cylinders and connections between said cylinders and said container supporting means effective to invert a container carried by said container supporting means and discharge the contents thereof into said material receiving space.

References Cited by the Examiner

UNITED STATES PATENTS

| | | | |
|---|---|---|---|
| 2,385,512 | 9/45 | Heath | 214—140 |
| 2,469,321 | 5/49 | Wood | 214—77 |
| 2,652,163 | 9/53 | Stickney | 214—518 |
| 2,815,138 | 12/57 | Noffsinger | 214—140 |
| 2,900,096 | 8/59 | Dempster et al. | 214—302 |
| 2,908,411 | 10/59 | Ambarcumian | 214—304 |
| 2,951,602 | 9/60 | Walden et al. | 214—304 |
| 3,010,590 | 11/61 | Troth | 214—77 X |
| 3,016,157 | 1/62 | Brisson | 214—302 |

FOREIGN PATENTS 687,665  2/53  Great Britain.

HUGO O. SCHULZ, *Primary Examiner.*

GERALD M. FORLENZA, ERNEST A. FALLER, JR., *Examiners.*